(12) United States Patent
Ebrahimi Afrouzi

(10) Patent No.: US 9,701,020 B1
(45) Date of Patent: Jul. 11, 2017

(54) METHOD AND SYSTEM FOR ROBOTIC SURFACE COVERAGE

(71) Applicant: Bobsweep Inc., Toronto (CA)

(72) Inventor: Ali Ebrahimi Afrouzi, San Jose, CA (US)

(73) Assignee: Bobsweep Inc., Toronto, ON (CA)

( * ) Notice: Subject to any disclaimer, the term of this patent is extended or adjusted under 35 U.S.C. 154(b) by 57 days.

(21) Appl. No.: 14/817,952

(22) Filed: Aug. 4, 2015

Related U.S. Application Data

(60) Provisional application No. 62/092,800, filed on Dec. 16, 2014.

(51) Int. Cl.
*G05B 19/418* (2006.01)
*B25J 9/16* (2006.01)

(52) U.S. Cl.
CPC ............ *B25J 9/1666* (2013.01); *Y10S 901/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,236,365 B1* | 5/2001 | LeBlanc | ............... | G01C 21/206 342/450 |
| 8,930,023 B2* | 1/2015 | Gutmann | ............. | G05D 1/0234 700/245 |
| 9,250,081 B2* | 2/2016 | Gutmann | ............. | G05D 1/0231 |
| 9,323,250 B2* | 4/2016 | Wang | ..................... | G05D 1/028 |
| 9,360,300 B2* | 6/2016 | DiBernado | | |
| 9,375,847 B2* | 6/2016 | Angle | .................. | H04L 12/282 |
| 2005/0213082 A1* | 9/2005 | DiBernardo | ............ | G01S 5/163 356/139.03 |
| 2006/0061478 A1* | 3/2006 | Kim | ........................ | G08B 25/10 340/628 |
| 2007/0096676 A1* | 5/2007 | Im | ......................... | G05D 1/0225 318/587 |
| 2007/0213892 A1* | 9/2007 | Jones | ...................... | A47L 11/00 701/23 |
| 2007/0285041 A1* | 12/2007 | Jones | ................... | G05D 1/0219 318/568.12 |
| 2009/0082879 A1* | 3/2009 | Dooley | .................. | B25J 9/1658 700/3 |
| 2010/0049364 A1* | 2/2010 | Landry | ................ | G05D 1/0272 700/245 |
| 2010/0063628 A1* | 3/2010 | Landry | ............... | A47L 11/4011 700/258 |

(Continued)

*Primary Examiner* — Jonathan L Sample
(74) *Attorney, Agent, or Firm* — Soody Tronson; STLGip

(57) ABSTRACT

Methods for minimizing redundancy of surface coverage of a workspace using a robotic device and a base station are presented, the methods including: creating a polar map of the workspace defined by a number of cells; creating a policy by dividing the workspace into a number of zones each defined by a portion of the number of cells and by ordering the number of zones for surface coverage; selecting a zone of the number of zones for surface coverage by the robotic device; creating a cell matrix of the portion of number of cells representing the selected zone; assigning the selected zone to the robotic device; covering the selected zone by the robotic device; reporting an actual zone coverage to the base station; updating a coverage matrix corresponding with the cell matrix of the selected zone to indicate coverage; and calculating a penalty.

20 Claims, 8 Drawing Sheets

(56) References Cited

U.S. PATENT DOCUMENTS

| | | | | |
|---|---|---|---|---|
| 2010/0305752 A1* | 12/2010 | Abramson | ................ | G01S 1/70 |
| | | | | 700/245 |
| 2011/0153136 A1* | 6/2011 | Anderson | ............ | G05D 1/0219 |
| | | | | 701/25 |
| 2011/0202175 A1* | 8/2011 | Romanov | ........... | A47L 11/4011 |
| | | | | 700/250 |
| 2013/0006419 A1* | 1/2013 | Bergstrom | ........... | A01D 34/008 |
| | | | | 700/245 |
| 2013/0138246 A1* | 5/2013 | Gutmann | ............. | G05D 1/0231 |
| | | | | 700/253 |
| 2013/0218342 A1* | 8/2013 | Teng | .................... | G05D 1/0231 |
| | | | | 700/259 |
| 2013/0288692 A1* | 10/2013 | Dupray | ................ | H04W 64/00 |
| | | | | 455/450 |
| 2014/0100736 A1* | 4/2014 | Kim | .................... | G05D 1/0219 |
| | | | | 701/26 |
| 2014/0243012 A1* | 8/2014 | Wirola | ................. | G01S 5/0263 |
| | | | | 455/456.1 |
| 2015/0323934 A1* | 11/2015 | Lin | .......................... | G01S 5/02 |
| | | | | 701/26 |

\* cited by examiner

FIG. 4

$$t_0 \quad 400 \rightarrow \begin{bmatrix} (\theta_1, 1) & (\theta_1, 2) & (\theta_1, 3) \\ (\theta_2, 1) & (\theta_2, 2) & (\theta_2, 3) \\ (\theta_3, 1) & (\theta_3, 2) & (\theta_3, 3) \\ (\theta_4, 1) & (\theta_4, 2) & (\theta_4, 3) \end{bmatrix} \begin{bmatrix} 0 & 0 & 0 \\ 0 & 0 & 0 \\ 0 & 0 & 0 \\ 0 & 0 & 0 \end{bmatrix} \leftarrow 401$$

$$t_1 \quad 400 \rightarrow \begin{bmatrix} (\theta_1, 1) & (\theta_1, 2) & (\theta_1, 3) \\ (\theta_2, 1) & (\theta_2, 2) & (\theta_2, 3) \\ (\theta_3, 1) & (\theta_3, 2) & (\theta_3, 3) \\ (\theta_4, 1) & (\theta_4, 2) & (\theta_4, 3) \end{bmatrix} \begin{bmatrix} 1 & 1 & 1 \\ 1 & 1 & 1 \\ 1 & 1 & 1 \\ 1 & 1 & 1 \end{bmatrix} \leftarrow 401$$

$$t_2 \quad 403 \rightarrow \begin{bmatrix} (\theta_3, 2) & (\theta_3, 3) & (\theta_3, 4) \\ (\theta_4, 2) & (\theta_4, 3) & (\theta_4, 4) \\ (\theta_5, 2) & (\theta_5, 3) & (\theta_5, 4) \\ (\theta_6, 2) & (\theta_6, 3) & (\theta_6, 4) \end{bmatrix} \begin{bmatrix} 1 & 1 & 1 \\ 1 & 1 & 1 \\ 1 & 1 & 1 \\ 1 & 1 & 1 \end{bmatrix} \leftarrow 401 \quad \begin{bmatrix} 1 & 1 & 1 \\ 1 & 1 & 1 \\ 1 & 1 & 0 \\ 1 & 1 & 0 \\ 0 & 0 & 0 \\ 0 & 0 & 0 \end{bmatrix} \leftarrow 404$$

$$t_3 \quad 403 \rightarrow \begin{bmatrix} (\theta_3, 2) & (\theta_3, 3) & (\theta_3, 4) \\ (\theta_4, 2) & (\theta_4, 3) & (\theta_4, 4) \\ (\theta_5, 2) & (\theta_5, 3) & (\theta_5, 4) \\ (\theta_6, 2) & (\theta_6, 3) & (\theta_6, 4) \end{bmatrix} \begin{bmatrix} 1 & 1 & 1 \\ 1 & 1 & 1 \\ 1 & 1 & 1 \\ 1 & 1 & 1 \end{bmatrix} \leftarrow 401 \quad 404 \rightarrow \begin{bmatrix} 1 & 1 & 1 \\ 1 & 1 & 1 \\ 2 & 2 & 1 \\ 2 & 2 & 1 \\ 1 & 1 & 1 \\ 1 & 1 & 1 \end{bmatrix}$$

FIG. 6

| Session | Zone Division Method | Order of Zones Serviced | Net Rewards |
|---|---|---|---|
| 1 | Random | A,B,D,F,E,H,C,G... | 250 |
| 2 | Largest possible zones | D,B,H,A,G,E,C,F... | 285 |
| 3 | Zones with area equivalent to approximately 3 sq. feet | B,D,A,H,F,C,E,G... | 195 |
| 4 | Zones of approximately equal size | B,A,G,E,C,F,D,H... | 190 |
| 5 | Random | H,F,C,E,B,A,G,D... | 268 |
| 6 | Zones with area less than 3.5 sq. feet | H,F,C,E,B,A,G,D... | 224 |
| 7 | Largest possible zones | D,B,H,E,A,G,C,F... | 292 |

METHOD AND SYSTEM FOR ROBOTIC SURFACE COVERAGE

FIELD OF INVENTION

The present invention generally relates to automated robotic path generation for moving a robotic device autonomously, and device and systems using the same.

BACKGROUND

It has always been a challenge with autonomous cleaning robots to ensure full coverage of a working area in a timely manner. Several efforts have been made to address this challenge. Conventional surface coverage robots utilize basic movement patterns that are often unplanned or random—meaning that overlapping of serviced areas is inevitable. In a random coverage pattern, efficiency over time decreases because paths become more and more likely to overlap. Further, random coverage patterns may be less efficient due to additional charging required for battery operated robotic devices. Additional attempts to improve surface coverage efficiency involves complex mapping systems requiring expensive technology, including additional sensors, image processors, advanced processors, etc. In those instances, acquisition and maintenance costs may be prohibitive. A need exists for a more economical and practical solution to decrease a surface coverage robot's redundancy and thereby increase efficiency. As such, methods and systems for robotic surface coverage are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, methods for minimizing redundancy of surface coverage of a workspace using a robotic device and a base station are presented, the methods including: creating a polar map of the workspace defined by a number of cells; creating a policy by dividing the workspace into a number of zones each defined by a portion of the number of cells and by ordering the number of zones for surface coverage; selecting a zone of the number of zones for surface coverage by the robotic device; creating a cell matrix of the portion of number of cells representing the selected zone; assigning the selected zone to the robotic device; covering the selected zone by the robotic device; reporting an actual zone coverage to the base station; updating a coverage matrix corresponding with the cell matrix of the selected zone to indicate coverage; and calculating a penalty based on the selected zone and the actual zone coverage. In some embodiments, methods further include: continuing to cover the number of zones until each of the number of cells of the workspace is covered at least once; calculating a reward based on surface coverage of the workspace; and assigning the reward to the policy. In some embodiments, methods further include: iteratively creating a number of policies for surface coverage to maximize the reward thereby minimizing redundancy of the robotic surface coverage. In some embodiments, the penalty is a product of an absolute difference between the selected zone and the actual zone coverage and a reward value. In some embodiments, the penalty is decreased by a decay factor to account for an inherent possibility of increased redundancy as additional zones in the workspace are covered. In some embodiments, each of the number of cells are defined by an ordered pair where a first value represents an angle and a second value represents a distance from the base station. In some embodiments, the policy is based on a zone division method of the number of zones and an order in which the number of zones are covered.

In other embodiments, systems for minimizing redundancy of surface coverage of a workspace are presented including: a robotic device; and a base station, where the base station is configured to: create a polar map of the workspace defined by a number of cells, create a policy by dividing the workspace into a number of zones each defined by a portion of the number of cells and by ordering the number of zones for surface coverage, select a zone of the number of zones for surface coverage by the robotic device, create a cell matrix of the portion of number of cells representing the selected zone, assign the selected zone to the robotic device, update a coverage matrix corresponding with the cell matrix of the selected zone to indicate coverage, and calculate a penalty based on the selected zone and an actual zone coverage, and where the robotic device is configured to: cover the selected zone by the robotic device, and report the actual zone coverage to the base station.

In other embodiments, computing device program products for minimizing redundancy of surface coverage of a workspace using a robotic device and a base station are presented including: a non-transitory computer readable medium; first programmatic instructions for creating a polar map of the workspace defined by a number of cells; second programmatic instructions for creating a policy by dividing the workspace into a number of zones each defined by a portion of the number of cells and by ordering the number of zones for surface coverage; third programmatic instructions for selecting a zone of the number of zones for surface coverage by the robotic device; fourth programmatic instructions for creating a cell matrix of the portion of number of cells representing the selected zone; fifth programmatic instructions for assigning the selected zone to the robotic device; sixth programmatic instructions for covering the selected zone by the robotic device; seventh programmatic instructions for reporting an actual zone coverage to the base station; eighth programmatic instructions for updating a coverage matrix corresponding with the cell matrix of the selected zone to indicate coverage; and ninth programmatic instructions for calculating a penalty based on the selected zone and the actual zone coverage.

BRIEF DESCRIPTION OF THE DRAWINGS

Non-limiting and non-exhaustive features of the present invention are described with reference to the following figures, wherein like reference numerals refer to like parts throughout the various figures.

FIG. 4 is an illustrative representation of sample matrices that represent zones of a workspace and cell coverage within zones embodying features of the present invention;

FIG. 6 is an illustrative representation of a sample table in which the base station records actions and resulting rewards embodying features of the present invention;

DETAILED DESCRIPTION

Figure 1:
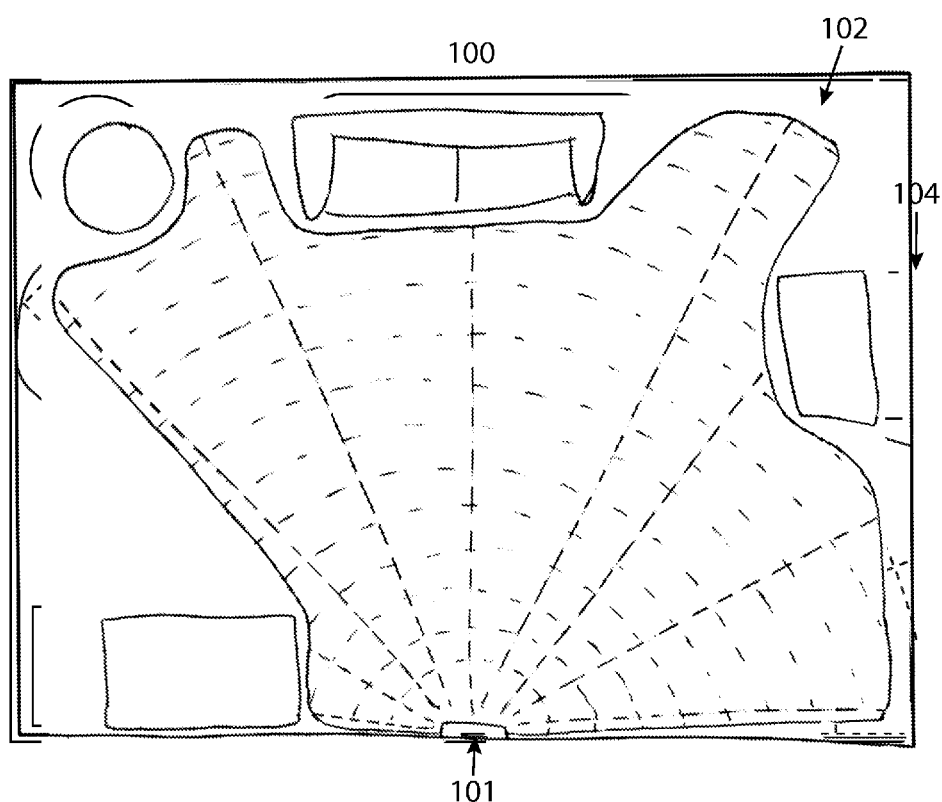
FIG. 1 is an illustrative representation of a base station's polar coordinate map of a workspace embodying features of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Methods for robotic surface coverage utilizing a robotic device and a base station that function in tandem to increase efficiency by defining a navigation policy based on outcomes of prior actions of the robotic device that minimizes coverage redundancy are presented herein. Briefly, a base station may use sensors to create a polar coordinate map of the workspace and divide the workspace into zones, which may be assigned to the robotic device for servicing. The robotic device reports its actions to the base station, which keeps a record of the serviced areas of its polar coordinate map. Each time the robotic device completes a zone, a penalty is assessed that is based on the area actually covered compared to the area expected to be covered. The robotic device may be configured to try to maximize rewards at all times while servicing the zones in spite of the penalties. Once all zones of a workspace are completed, a reward is awarded. The base station may track the pattern of servicing and the net rewards from each completed work session and may calculate the value of each work session. Over time, the base station records additional sessions and their corresponding values to develop a policy representing the most efficient pattern of servicing the workspace thereby minimizing the probability of redundancy.

FIG. 1 is an illustrative representation of a base station's polar coordinate map of a workspace embodying features of the present invention. The proposed methods provided herein provision systems for increasing a surface coverage robot's efficiency by minimizing the probability of redundancy over time utilizing machine learning techniques. One desirable outcome may be to optimize the selection of working zones by defining a navigation policy that may make intelligent decisions by methodically observing a robotic machine's state across discrete times. The problem of selecting zones may be treated as a discrete time stochastic process. The Markov decision process may be utilized as a mathematical tool to solve the problem.

Figure 2:
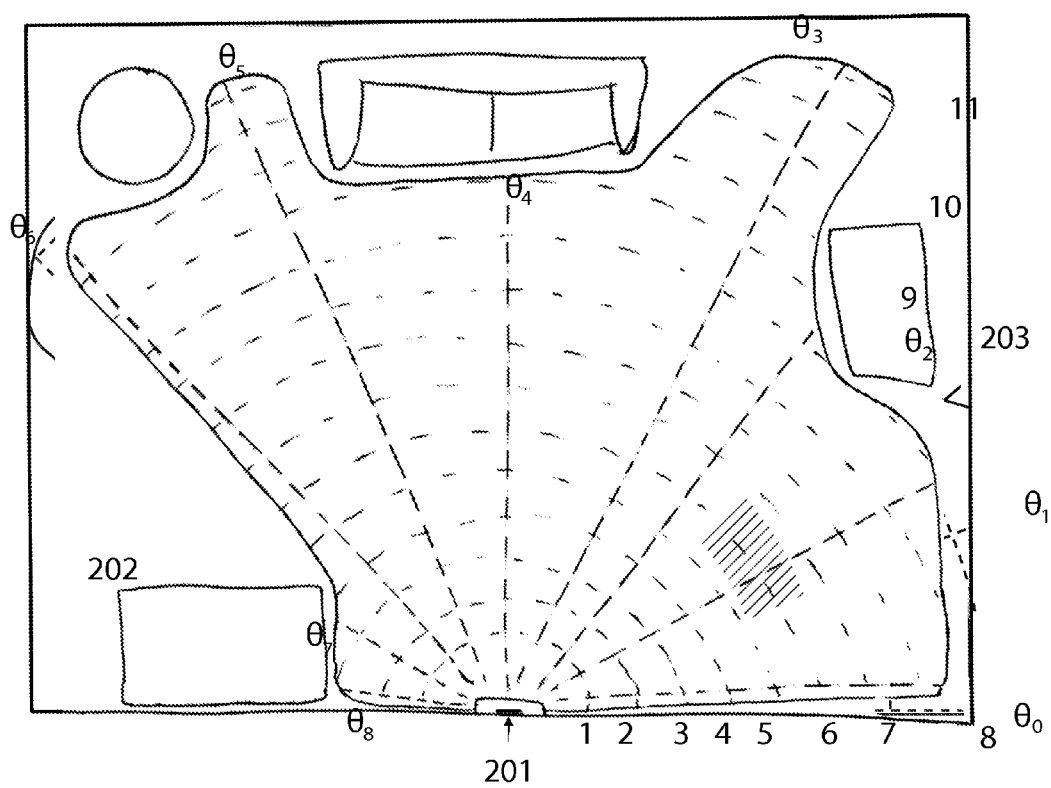
FIG. 2 is an illustrative representation of a base station's polar coordinate map with units labeled embodying features of the present invention.

Generally, a surface coverage robot and its base station may function in tandem to accomplish the task of physically covering all areas of a workspace. In operation, a base station uses range finder detection sensors to establish a polar coordinate map of the workspace. Illustrated is an overhead view of a workspace 100 containing base station 101 and a number of obstacles 104. The base station may create polar map 102 of workspace 100 is smaller than the actual area of the workspace because the range finder detection sensors may not penetrate obstacles resulting in accuracy that is less than 100%. Each cell within the polar coordinate map may be defined by an ordered pair wherein the first value represents the angle and the second value represents the distance from the origin as represented in FIG. 2, which is an illustrative representation of a base station's polar coordinate map with units labeled embodying features of the present invention. FIG. 2 illustrates polar coordinate map 202 alone (i.e. without obstacles) and with units labeled as in FIG. 1. Subsection 203 may be identified by the base station 201 as ($\theta_2$, 6). Any workspace embodiment may be represented by an N×M matrix with each ordered pair representing a cell used as an element of the matrix.

In operation, a base station may select any subsection (or zone) of the workspace for the robot to work in. Subsections comprises a set of ordered pairs, which can also be written as an n×m matrix where:

$n \subseteq N$ and $m \subseteq M$ and therefore $n \times m \subseteq N \times M$ Although any method of subsection selection is possible, one desirable outcome may be to calculate a policy ($\pi$) which makes selection such that probability of redundancy is minimized over time. For example, in conventional solutions the base station could make selections by prioritizing the largest parts of the workspace first, or the base station could separate the workspace into zones of approximately equal size, or the base station could select areas at random. None of these conventional examples of selection processes reduce the probability of redundancy.

Figure 3:
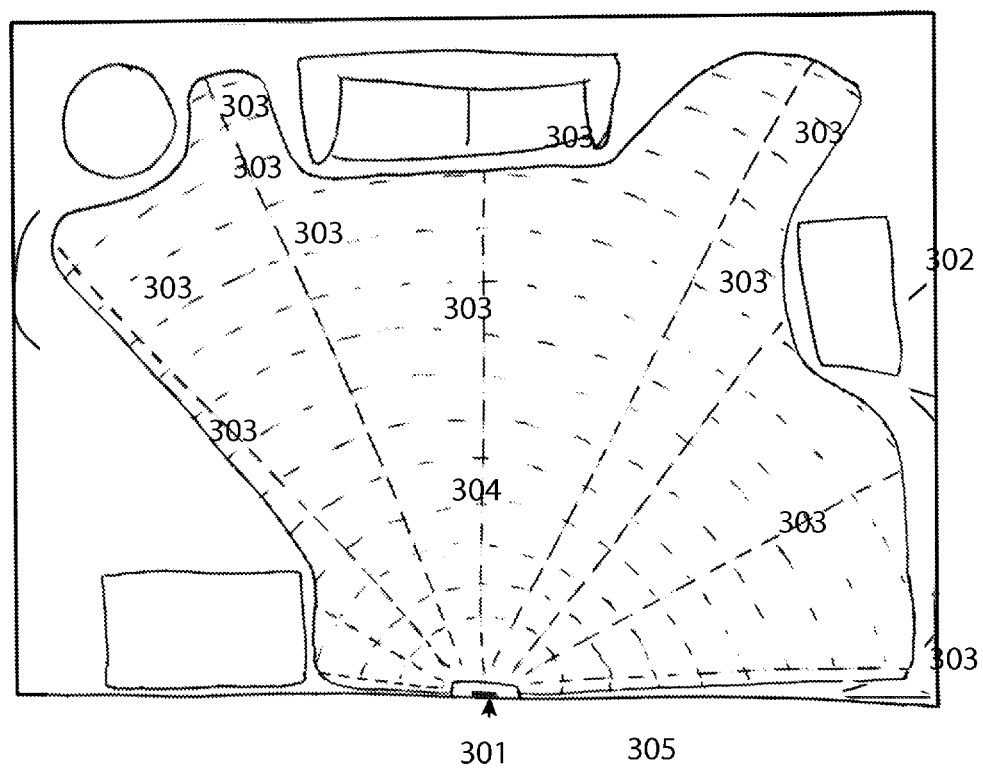
FIG. 3 is an illustrative representation of a base station's division of a workspace into smaller zones embodying features of the present invention.

FIG. 3 is an illustrative representation of a base station's division of a workspace into smaller zones embodying features of the present invention. FIG. 3 illustrates base station 301 and associated map 302 of a workspace. In this illustration, base station 301 has divided the polar coordinate map (see FIGS. 1 and 2) into a number of circular zones 303. In operation, a base station identifies a first zone for work and estimates the approximate area of the zone using its polar coordinate map. The base station then sends a signal to a robotic device indicating where to move based on the robotic device's current location. The robotic device moves from its current location to the point identified by the base station. The base station also signals to the robotic device where to work relative to the new location. For example, the base station could signal to the robotic device to service all the space within 3 feet from the starting point. Upon completing the identified zone, the robotic device sends a signal to the base station indicating how much area was serviced, which can be measured through dead reckoning, odometry, or any other means that the robotic device has for keeping track of area covered.

During operation, the base station receives a report of actual area covered and compares it to its initial estimation of the area of the zone. The absolute value of the difference between the actual area covered and the initial estimation of the area of the zone is multiplied by a reward to obtain the value of a small negative reward (i.e. a penalty) that the base station assigns to the robotic device. The following formula may be utilized in embodiments to represent this process:

$$|W(\text{estimated}) - W(\text{actual})| R\gamma t = \text{Total Reward}$$

W=area of workspace covered
R=reward rate
t=discrete time
$0 > \gamma > 1$

The deviation, $|W_{(estimated)} - _{(actual)}|$, may be multiplied by a fixed reward rate, which may be multiplied by $\gamma$ to the power of time, where $\gamma$ is a fixed number between 0 and 1, representing the amount that the reward decreases over time. That is, $\gamma$ represents a decay factor, which decreases the total penalty as discrete time goes on because the inherent possibility for redundancy increases as more and more zones in the workspace are serviced.

The robotic device is configured to maximize rewards at all times, so the device continually attempts to minimize the absolute value of the difference between the area estimated to be covered and actually covered. This attempt may be represented by the following formulas:

$$|W_{(estimated)} - W_{(actual)}| = \text{Deviation}$$

$$\text{ArgMin} |W_{(estimated)} - W_{(actual)}|$$
$$D$$

The greater the deviation from the area expected to be covered, the larger the penalty. However, the robotic device is incentivized to complete cleaning of all the zones despite the penalty because, upon completion of the entire workspace, a large positive reward will be awarded. In operation, the base optimizes zone creation through a system that achieves the least redundancy by the manner in which the zones are selected. In embodiments, selection criteria may include without limitation: the size of the zone, the shape of the zone, the order of the zone coverage, etc.

Several types of redundancy may occur in robotic surface coverage. Working within zones, a robotic device's coverage pattern may overlap inside a given zone. Paths may have a small or large amount of overlap with each other. Redundancy is also encountered in the overlap between zones. As FIG. 3 illustrates, the incidence of zones overlaps. For example, if each circular zone 303 is covered once, the cells in areas where the zones overlap may be covered two or three times. The area 304, for example, will be covered twice, and the area 305 will be covered three times. This type of redundancy is accounted for by proposed embodiments. Another redundancy in traveling between zones may occur. In one embodiment, redundancy in traveling between zones may be taken into account by assigning a negative reward based on the difference between the actual distance traveled by the robotic device to move between zones and the shortest possible distance between zones as calculated by the base station using its polar coordinate map of the workspace. In an embodiment, the same process of calculating the values of each state and generating a policy will be applied to calculate the movement path that yields the highest rewards. Thus, in embodiments, the order of selecting zones will also depend on the redundancy incurred when moving from one zone to another. In another embodiment, the widely used A* algorithm, which is a well-known algorithm to find the shortest path from a point A to a point B, may be utilized to travel between zones to minimize redundancy of this kind.

Figure 5:
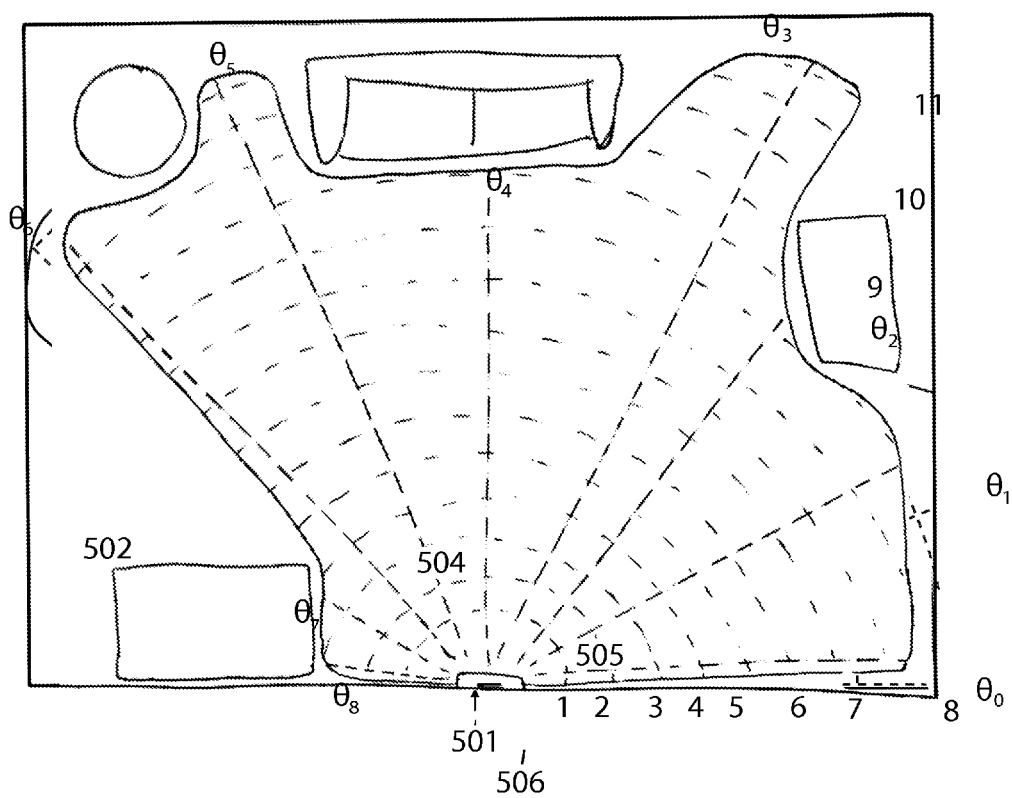
FIG. 5 is an illustrative representation of a polar map corresponding with sample matrices embodying features of the present invention.

FIG. 4 is an illustrative representation of sample matrices that represent zones of a workspace and cell coverage within zones embodying features of the present invention and FIG. 5 is an illustrative representation of a polar map corresponding with sample matrices embodying features of the present invention. Each time a zone is completed by a robotic device, the base station identifies all the ordered pairs or cells in that zone as covered once. A second matrix is created, corresponding to the first matrix to represent coverage. FIG. 4 illustrates initial cell matrix 400 in time slot $t_0$ that comprises all the cells that will be serviced by the robotic device in the first assigned zone. Referring briefly to FIG. 5, matrix $t_0$ corresponds with area 505. Returning to FIG. 4, at time $t_0$, corresponding coverage matrix 401 shows that each cell has been covered 0 times. When the base station receives notification that that zone has been completed in time slot $t_1$, the base station updates coverage matrix 401 by adding 1 to each value in the matrix indicating that each cell in the zone was covered once. Subtracting an ideal, or estimated coverage matrix (wherein all values are 1), from the coverage matrix 401 yields the robotic device's deviation from the ideal. That is, the amount that the robotic device deviated from the plan. In this case, each cell was only covered once, so the deviation is zero and the smallest possible penalty value is assigned. In practice, the first zone serviced will always yield an ideal coverage matrix, because overlap between zones has not yet occurred since there is only one zone that has yet been serviced at this point. However, as time goes on, overlap between zones becomes increasingly likely. As mentioned earlier, a decay factor is multiplied times the value of the penalty so that the actual amount penalized accounts for the increased possibility of redundancy as time increases.

The base station then assigns the calculated penalty to the robotic device and work continues. The base station assigns the next zone to the robotic device, which is depicted in FIG. 4 by cell matrix 403 and as illustrated in FIG. 5 by area 504 at time slot $t_2$. Coverage matrix 404 corresponding with cell matrix 403 shows that four cells in this coverage matrix overlap with cells from coverage matrix 401 corresponding with cell matrix 400. This overlap is further illustrated in FIG. 5 at 506. Upon completion of cell matrix 403 at time slot $t_3$, the base station updates the coverage matrices. The base station adds 1 to each value in the matrix 404. The overlapped sections now reflect that some cells were covered twice, and others were covered once. The robotic device repeats the process of calculating the penalty based on deviation and time The entire workspace can be represented by one large matrix from which smaller matrices, or zones, are carved out and serviced. As the process continues, the values in the coverage matrices increase. Over time, the remaining possible matrices are narrowed until there is only one possible matrix left. The final matrix is serviced and the process is complete when all of the values of the coverage matrices in the workspace are nonzero. That is, work continues until each cell in the workspace has been covered at least once.

When all of the cells in the workspace have been covered at least once, the system has reached an absorbing state. At this point, the robotic device is awarded a fixed large positive reward for completing all the zones of the workspace.

The reward of each state may be represented by:

$$R_{(s)} = R_{(ts)} \gamma^t$$

The reward after the transition from state (s) to (s') may be represented by:

$$R_{(s')} = R_{(ts)} \gamma^t + R_{(ts+1)} \gamma^{t+1}$$

The total reward for work in the session can be represented by the following formula:

$$R_{(t0)} \gamma^t + R_{(t1)} \gamma^t + R_{(t2)} \gamma^t + R_{(t3)} \gamma^t + \ldots + R_{(tn)} \gamma^t = \text{Total reward}$$

The robotic device is configured to attempt to maximize this value at all times, which is represented by the formula:

$$E[\Sigma \gamma^t R_t] \rightarrow \text{Max}$$

Where E is the expectation that R(reward) is maximized,

Therefore, the value of state(s) when policy ($\pi$) is executed equals the expected sum of all future discounted rewards provided that initial state ($s_0$) is (s) and policy ($\pi$) is executed as represented by the formula:

$$_{(s)}{}^\pi V = E_{\pi_t}[\Sigma \gamma^t R_t | s_0 = s]$$

FIG. 6 is an illustrative representation of a sample table in which the base station records actions and resulting rewards embodying features of the present invention. Each time a robot completes servicing a workspace, the base station records the zone divisions, the order they were serviced, and the net rewards earned by the robot in a table. FIG. 6 depicts an example of such a table. As illustrated, table 600 includes session column 602, zone division column 604, order of zones serviced column 606, and net rewards column 608. These columns identify characteristics of several sessions. After servicing a workspace a number of times, the base station may use the data to determine which combination of servicing methods produces the highest reward.

From the above, value iteration may be concluded:

$$V_{(s)} = [\max_{a_s} \gamma \Sigma P(s|s,a) V_{(s')}] + R_{(s)}$$

Where:
$\max_a$=maximizing action
$V_{(s')}$=value of successor
$R_{(s)}$=Reward or cost to get to state s P=state transition function
R=Reward function The above formula is found after convergence according to Bellman's equation represented by the formula:

$$\max \sum_{t=0}^{\infty} \beta^t \mu(c_t) \text{ subject to}$$

$$a_{t+1} = (1+r)(a_t - c_t), c_t \geq 0, \text{ and}$$

$$\lim_{t \to \infty} a_t \geq 0, \text{ and}$$

$$V(a) = \max_{0 \leq c \leq a} \{\mu(c) + \beta V((1+r)(a-c))\}$$

The value of a given state depends on the outcome of the prior state multiplied by the cost (penalty incurred) to get there. The base station can then compare the values of the patterns used in each session and determine which pattern has the highest value. As the robot and base station complete more and more coverage sessions, more and more data is gathered, and values are assigned to each state. That is, a value is assigned to each order and method of zone servicing. Once values have been assigned to the zone servicing methods and orders, the system can calculate a policy to maximize rewards. The base station develops a policy, n, which defines the best servicing method yet discovered. This is represented by the formula:

$$\pi(s) = \arg\max \sum_{s'} P(s' | s_1 a) V(s')$$

From value iteration methods may find policy 1, which is a better policy than policy 0 and then find a policy 2, which is better than policy 1 and so on. The above formula therefore finds the best eventual policy.

$P_a(s,s') = \Pr(st+1=s'|st=s, at=a)$ is the probability that action a in state s at time t will lead to state s' at time t+1 and $R_a(s,s')$ is the immediate reward received after transition to state s' from s And $\gamma \in [0,1]$ is the discount factor.

A desirable outcome is to choose a policy, $\pi$, that will maximize the expected discounted sum of the rewards collected at any given S. The base station uses the policy, $\pi$ to service the workspace in the best known manner.

In this method, S (state) refers to each possible zone defined in the working area. A finite number of zones is possible, thus there are a finite set of states. A is the action of selecting zones, which takes the robot from state S to state S'. $A_s$ is the finite set of possible zones defined from any state. T is the time interval between each state transition of S to S'.

Figure 7:
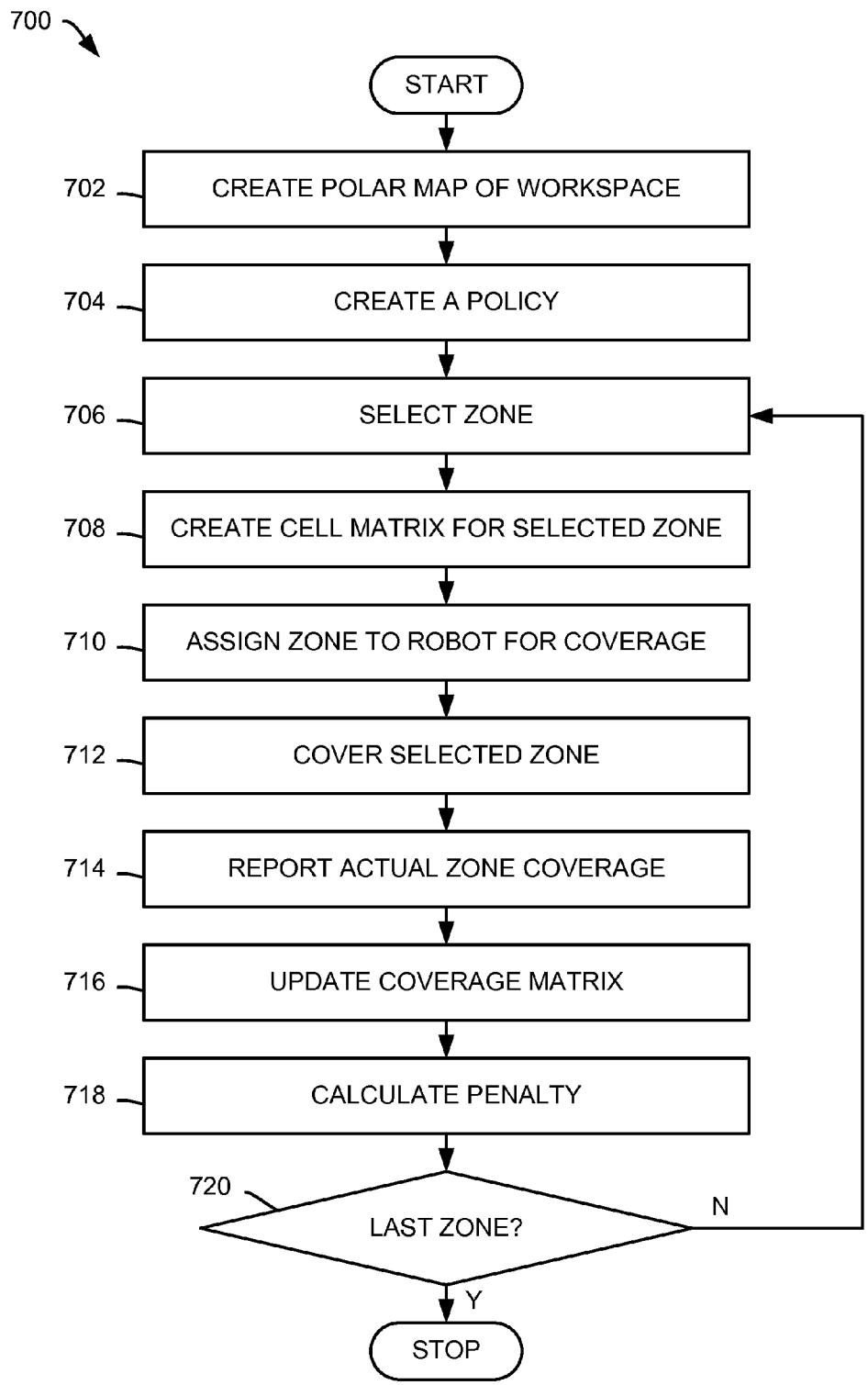
FIG. 7 is an illustrative flowchart of methods for minimizing redundancy of surface coverage of a workspace using a robotic device embodying features of the present invention.

FIG. 7 is an illustrative flowchart 700 of methods for minimizing redundancy of surface coverage of a workspace using a robotic device embodying features of the present invention. At a first step 702, the method creates a polar map of the workspace defined by a number of cells. As noted above, each cell within the polar coordinate map may be defined by an ordered pair wherein the first value represents the angle and the second value represents the distance from the base station. At a next step 704, the method creates a policy by dividing the workspace into zones each defined by a portion of the cells and by ordering the zones for surface coverage by a robotic device. At a next step 706, the method selects a zone for surface coverage by the robotic device. Selection may proceed in any number of manners without departing from embodiments disclosed herein. In embodiments, selection criteria may include without limitation: the size of the zone, the shape of the zone, the order of the zone coverage, etc. At a next step 708, the method creates a cell matrix of the portion of plurality of cells representing the selected zone and a corresponding coverage matrix representing coverage of the selected zone. At a next step 710, the method assigns the selected zone to the robotic device. In operation, a signal may be sent from the base station to the robotic device issuing movement instructions to arrive at the selected zone and cover the selected zone. At a next step 712, the method covers the selected zone by the robotic device. Any number of methods for covering a selected zone may be utilized in embodiments without limitation.

At a next step 714, the method reports an actual zone coverage to the base station. Upon completing the identified zone, the robotic device sends a signal to the base station indicating how much area was serviced, which can be measured through dead reckoning, odometry, or any other means that the robotic device has for keeping track of area covered. At a next step 716, the method updates a coverage matrix corresponding with the cell matrix of the selected zone to indicate coverage. In embodiments, updating adds 1 to each subsection of the coverage matrix. At a next step 718, the method calculates a penalty based on the selected zone and the actual zone coverage and assigns the penalty accordingly. In embodiments, the penalty is a product of an absolute difference between the selected zone and the actual zone coverage and a reward value. Furthermore, in embodiments, the penalty may be decreased by a decay factor to account for an inherent possibility of increased redundancy as additional zones in the workspace are covered. At a next step 720, the method determines whether the last zone has been covered. If the method determines at a step 720 that the last zone has not been covered, the method continues to a step 706 to select another zone for coverage. If the method determines at a step 720 that the last zone has been covered, the method ends.

Method embodiments disclosed herein may utilize any number of base stations in coordination with a robotic device so that any number of areas managed by base stations may be serviced by a single robotic device. Likewise, any number of robotic devices may be utilized and synchronized with a single or number of base stations to service a number of areas managed by base stations. Further embodiments may maintain communication between a base station and a robotic device by utilizing a keep alive signal such that when the keep alive signal is lost, the robotic device returns to the base station.

Figure 8:
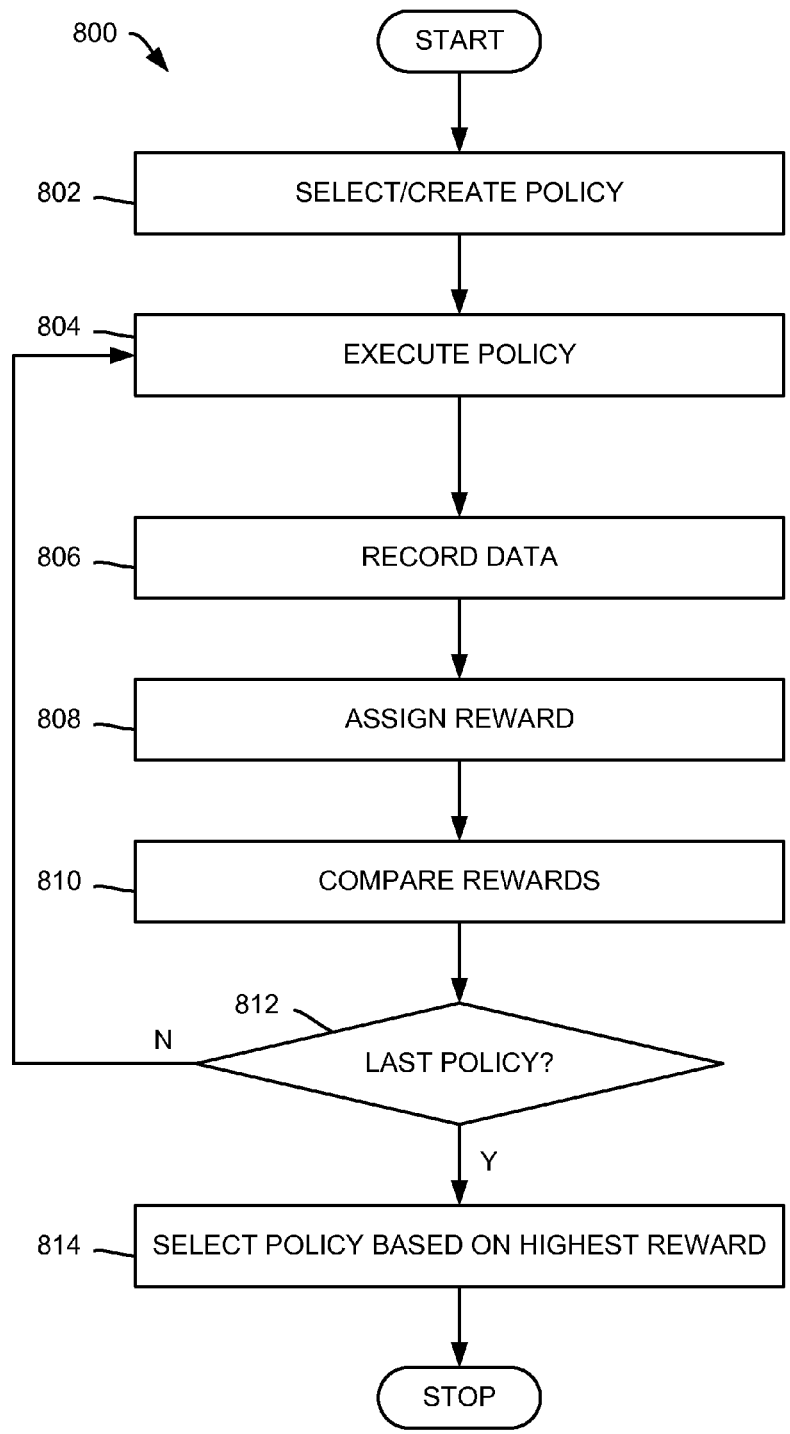
FIG. 8 is an illustrative flowchart of methods for minimizing redundancy of surface coverage of a workspace using a robotic device embodying features of the present invention.

FIG. 8 is an illustrative flowchart 800 of methods for minimizing redundancy of surface coverage of a workspace using a robotic device embodying features of the present invention. At a step 802, the method selects or creates a policy. At a step 804, the method executes the policy. In executing a policy, methods may iteratively follow steps 706 to 720 as illustrated and disclosed above. In embodiments, a policy is based on a zone division method of the zones and an order in which the zones are covered. Furthermore, in embodiments, the zone division method may include any of: a random zone division method, a largest possible zone division method, a smallest possible zone division method, an approximate area zone division method, an approximately equal size zone division method, a maximum area zone division method, and a minimum area zone division method. In embodiments, policies may be iteratively created or selected for surface coverage to maximize the reward thereby minimizing redundancy of the robotic surface coverage. Once a policy has been executed, the method records data at a step 806 and a reward may be calculated and assigned at a step 808. At a next step 810, the method compares rewards of policies. At a next step 810, the method determines whether the last policy has been executed. If the method determines at a step 810 that the last policy has not been executed, the method continues to a step 804 to execute another policy. If the method determines at a step 812 that the last policy has been executed, the method continues to a step 814 to select a policy based on the highest reward. In this manner, by iteratively selecting or creating policies and rewarding those policies based on coverage, redundancy may be reduced.

In one embodiment, multiple base stations and multiple robotic devices can be used to collaborate together in servicing one large workspace. In this embodiment, base stations communicate the serviced matrices with other base stations so that a larger matrix encompassing the entire work area may be accurately drawn. Deviation may be calculated from the cumulative actual area covered by participating robotic devices and the cumulative expected area. In this embodiment, robotic devices must avoid the areas already covered by other robotic devices, thus base stations must avoid creating zones that encompass areas already covered or selected by other base stations. The policies in this case maximize the rewards for each robotic device and base station pair depending on the policies of the other robotic device and base station pairs. Over time, the policies will converge so that they all maximize rewards. Nash's existence theorem demonstrates that because there is a finite number of robotic device/base station pairs, and each robotic device/base station pair can choose from a finite number of pure strategies, and strategies are mixed by definition, there will be at least one Nash equilibrium.

In another embodiment, a single robotic device may be used with multiple base stations. In this embodiment, the base stations are synchronized with each other so that once the robotic device has completed all zones from a first base station's workspace, said base station can signal to the robotic device to move to a second base station and work on zones in that base station's workspace. Various methods of moving the robotic device from the workspace of a first base station to a next base station are possible. In one embodiment, upon completion of work in a workspace, a first base station disallows the robotic device's movement in any direction that allows the robotic device to get closer to the first base station. This restriction may force the robotic device outside of the workspace of the first base station. Once the robotic device detects a signal from a second base station, the robotic device may begin work in the workspace of that base station according to the signaled instructions. The robotic device can mark the location where the transition occurred, so that if the robotic device needs to return to the first base station, the robotic device can navigate back to that point. In one embodiment, the robotic device also maintains a connection with the first base station and any subsequent base stations through two-way keepalives that are sent and received at intervals for as long as the signals can be reached. Anytime a connection is lost, the robotic device can communicate the event at that location to the base station that it still has a connection with, so that the base station can direct the robotic device to the point where the connection was lost to reconnect with the other base station if necessary. In another method for aiding a robotic device's transition between base stations, a subsequent base station is temporarily placed in the line of sight of the prior base station but within its workspace. The base stations in this embodiment have a detecting function, which is manually activated, and triggers the base stations to broadcast signals identifying themselves and listen for incoming broadcasts. Once detected, the base stations mark the locations of each other and save this location for future use. After the detection process, the subsequent base station can be moved from its temporary location to a permanent location.

In yet another embodiment, multiple robotic devices are used with a single base station. In this embodiment, robotic devices compete to service yet uncovered areas, so the policy created incorporates values from the sessions of all participating robotic devices. In all of these cases, the robotic devices and base stations can be configured at setup to give them some basic information, such as how many base stations exist in the system, how many robotic devices exist in the system, and which robotic devices are paired with which base stations. If there is no configuration, the system of robotic devices and base stations may converge and select the best possible solutions as explained above. As Nash's existence theorem explains, because there are a finite number of bases and robotic devices and each base or robotic device can choose from a finite number of pure strategies, and strategies are mixed by definition, there will be at least one Nash equilibrium that is comprised in the converged policy.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for minimizing redundancy of surface coverage of a workspace using a robotic device and a base station, the method comprising
    creating a polar map of the workspace defined by a plurality of cells;
    causing the base station to create a policy by dividing the workspace into a plurality of zones, the plurality of zones each defined by a portion of the plurality of cells and by
    ordering the plurality of zones for surface coverage by the robotic device;
    selecting a zone of the plurality of zones for surface coverage by the robotic device;
    creating a cell matrix of the portion of plurality of cells representing the selected zone;
    assigning the selected zone to the robotic device;
    covering the selected zone by the robotic device;
    reporting an actual zone coverage to the base station;
    updating a coverage matrix corresponding to the cell matrix of the selected zone to indicate surface coverage by the robotic device; and
    calculating a penalty based, at least in part, on a computed difference between the selected zone surface coverage and the actual zone coverage.

2. The method of claim 1, further comprising:
    continuing to cover the plurality of zones until each of the plurality of cells of the workspace is covered at least once;
    calculating a reward based, at least in part, on a computed absolute value of a difference between the surface coverage of the workspace and a surface area estimated to be covered; and assigning the reward to the policy.

3. The method of claim 2, further comprising:
    iteratively creating a plurality of navigation policies for surface coverage to maximize the reward thereby minimizing redundancy of the robotic surface coverage.

4. The method of claim 1, wherein the penalty is a product of an absolute difference between the selected zone and the actual zone coverage and a reward value.

5. The method of claim 4, wherein the penalty is decreased by a decay factor to account for an inherent possibility of increased redundancy as additional zones in the workspace are covered.

6. The method of claim 1, wherein each of the plurality of cells are defined by an ordered pair wherein a first value represents an angle and a second value represents a distance from the base station.

7. The method of claim 1, wherein the policy is based on a zone division method of the plurality of zones and an order in which the plurality of zones are covered.

8. The method of claim 7, wherein the zone division method is selected from the group consisting of: a random zone division method, a largest possible zone division method, a smallest possible zone division method, an approximate area zone division method, an approximately equal size zone division method, a maximum area zone division method, and a minimum area zone division method.

9. The method of claim 1, wherein covering the selected zone by the robotic device further comprises measuring the selected zone utilizes a measuring method selected from the group consisting of: dead reckoning measuring, and odometer measuring.

10. The method of claim 1, further comprising:
    utilizing a plurality of base stations in coordination with the robotic device.

11. The method of claim 10, wherein the plurality of base stations are synchronized to coordinate the robotic device movement.

12. The method of claim 1, further comprising:
    utilizing a plurality of robotic devices in coordination with the base station.

13. The method of claim 1, further comprising:
    maintaining communication between the base station and the robotic device by utilizing a keep alive signal such that when the keep alive signal is lost, the robotic device returns to the base station.

14. A system for minimizing redundancy of surface coverage of a workspace comprising:
    a robotic device; and
    a base station, wherein
        the base station is configured to:
            create a polar map of the workspace defined by a plurality of cells,
            create a policy by dividing the workspace into a plurality of zones, the plurality of zones each defined by a portion of the plurality of cells and by ordering the plurality of zones for surface coverage by the robotic device, select a zone of the plurality of zones for surface coverage by the robotic device, create a cell matrix of the portion of plurality of cells representing the selected zone, assign the selected zone to the robotic device, update a coverage matrix corresponding to the cell matrix of the selected zone to indicate surface coverage by the robotic device, and calculate a penalty based, at least in part, on a computed difference between the selected zone surface coverage and an actual zone coverage, and wherein the robotic device is configured to:
cover the selected zone by the robotic device, and
report the actual zone coverage to the base station.

15. The system of claim 14, wherein
the robotic device is further configured to continue to cover the plurality of zones until each of the plurality of cells of the workspace is covered at least once, and wherein the base station is further configured to calculate a reward based, at least in part, on a computed absolute value of a difference between the surface coverage of the workspace and a surface area estimated to be covered, and assign the reward to the policy.

16. The system of claim 15, wherein the base station is further configured to iteratively create a plurality of navigation policies for surface coverage to maximize the reward thereby minimizing redundancy of the robotic surface coverage.

17. The system of claim 14, wherein the penalty is a product of an absolute difference between the selected zone and the actual zone coverage and a reward value.

18. The system of claim 17, wherein the penalty is decreased by a decay factor to account for an inherent possibility of increased redundancy as additional zones in the workspace arc covered.

19. A computing device program product for minimizing redundancy of surface coverage of a workspace using a robotic device and a base station, the computing device program product comprising:

a non-transitory computer readable medium;

first programmatic instructions for creating a polar map of the workspace defined by a plurality of cells;

second programmatic instructions for causing the base station to create a policy by dividing the workspace into a plurality of zones, the plurality of zones each defined by a portion of the plurality of cells and by ordering the plurality of zones for surface coverage by the robotic device;

third programmatic instructions for selecting a zone of the plurality of zones for surface coverage by the robotic device;

fourth programmatic instructions for creating a cell matrix of the portion of plurality of cells representing the selected zone;

fifth programmatic instructions for assigning the selected zone to the robotic device; sixth programmatic instructions for covering the selected zone by the robotic device; seventh programmatic instructions for reporting an actual zone coverage to the base station;

eighth programmatic instructions for updating a coverage matrix corresponding to the cell matrix of the selected zone to indicate surface coverage by the robotic device; and ninth programmatic instructions for calculating a penalty based, at least in part, on a computed difference between the selected zone surface coverage and the actual zone coverage.

20. The program product of claim 19, further comprising:

tenth programmatic instructions for continuing to cover the plurality of zones until each of the plurality of cells of the workspace is covered at least once;

eleventh programmatic instructions for calculating a reward based, at least in part, on a computed absolute value of a difference between the surface coverage of the workspace and a surface area estimated to be covered; and twelfth programmatic instructions for assigning the reward to the policy.

* * * * *